US010581670B2

(12) United States Patent
Hawking et al.

(10) Patent No.: US 10,581,670 B2
(45) Date of Patent: Mar. 3, 2020

(54) CROSS-DATA CENTER INTEROPERATION AND COMMUNICATION

(71) Applicant: Microsoft Technology Licensing, LLC, Redmond, WA (US)

(72) Inventors: Robert G. Hawking, Seattle, WA (US); Shiguang Dong, Sammamish, WA (US); Roberto C. Taboada, Duvall, WA (US); Burra Gopal, Bellevue, WA (US); Seshadri Mani, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 820 days.

(21) Appl. No.: 14/874,156

(22) Filed: Oct. 2, 2015

(65) Prior Publication Data

US 2017/0099181 A1    Apr. 6, 2017

(51) Int. Cl.
*H04L 12/24* (2006.01)
*G06F 3/0484* (2013.01)
*H04L 29/08* (2006.01)

(52) U.S. Cl.
CPC ...... *H04L 41/0803* (2013.01); *G06F 3/04842* (2013.01); *H04L 67/306* (2013.01)

(58) Field of Classification Search
CPC .............. G06F 9/5077; G06F 9/45558; G06F 17/30309; G06F 3/0484; H04L 67/1021; H04L 47/822; G06Q 99/00; G06Q 30/0601
See application file for complete search history.

(56) References Cited

U.S. PATENT DOCUMENTS

| 7,664,866 B2 | 2/2010 | Wakefield |
| 9,003,006 B2 | 4/2015 | Xia et al. |
| 9,009,313 B2 * | 4/2015 | Rice ................. G06F 17/30309 709/219 |
| 2004/0123091 A1 | 6/2004 | Das |
| 2005/0188117 A1 | 8/2005 | Brown et al. |
| 2006/0271772 A1 | 11/2006 | Woundy et al. |
| 2007/0245013 A1 | 10/2007 | Saraswathy et al. |
| 2011/0055399 A1 | 3/2011 | Tung et al. |
| 2011/0231899 A1 | 9/2011 | Pulier et al. |
| 2012/0096149 A1 | 4/2012 | Sunkara et al. |

(Continued)

FOREIGN PATENT DOCUMENTS

WO    2014114727 A1    7/2014

OTHER PUBLICATIONS

"Second Written Opinion Issued in PCT Application No. PCT/US2016/053643", dated Jul. 18, 2017, 5 Pages.

(Continued)

*Primary Examiner* — Philip J Chea
*Assistant Examiner* — Mohammed Ahmed
(74) *Attorney, Agent, or Firm* — Christopher J. Volkmann; Kelly, Holt & Christenson, PLLC

(57) ABSTRACT

Users in a given organization are tagged with a data center identifier (or data location) that identifies a data center where the user's resources are located. A user request is detected, that indicates that the user wishes to access a resource that is tied to the user. The user is automatically navigated to the user's corresponding data center, where the user permissions are analyzed to selectively grant access to the requested resource.

11 Claims, 18 Drawing Sheets

(56) References Cited

U.S. PATENT DOCUMENTS

| | | | |
|---|---|---|---|
| 2012/0124211 A1 | 5/2012 | Kampas et al. | |
| 2012/0281706 A1 | 11/2012 | Agarwal et al. | |
| 2012/0281708 A1 | 11/2012 | Chauhan et al. | |
| 2012/0297016 A1 | 11/2012 | Iyer et al. | |
| 2013/0073716 A1* | 3/2013 | DeJana | G06F 9/5077 709/224 |
| 2013/0198717 A1 | 8/2013 | Igelka | |
| 2014/0013246 A1 | 1/2014 | Beechuk et al. | |
| 2014/0067780 A1 | 3/2014 | Lipscomb et al. | |
| 2014/0075501 A1 | 3/2014 | Srinivasan et al. | |
| 2014/0280595 A1 | 9/2014 | Mani et al. | |
| 2014/0280918 A1 | 9/2014 | Grandhe et al. | |
| 2015/0066853 A1 | 3/2015 | Martin | |
| 2015/0347240 A1 | 12/2015 | Eliás et al. | |
| 2016/0179499 A1 | 6/2016 | Reeves et al. | |
| 2016/0323142 A1 | 11/2016 | Mani et al. | |
| 2017/0237459 A1 | 8/2017 | Kim et al. | |

OTHER PUBLICATIONS

"International Preliminary Report on Patentability Issued in PCT Application No. PCT/US2016/053643", dated Jan. 26, 2018, 07 Pages.
Non-Final Office Action for U.S. Appl. No. 14/854,558 dated Nov. 3, 2017, 29 pages.
"Office Action Issued in European Patent Application No. 16725636.1", dated Feb. 13, 2019, 6 Pages.
"Office Action Issued in European Patent Application No. 16781604.0", dated Mar. 19, 2019, 6 Pages.
Katzer, et al., "Office 365 Administration Guide Enterprise", Mailed Date: https://rd.springer.com/chapter/10.1007/978-1-4302-6527-6_8, Jan. 4, 2014, pp. 365-428.
"Final Office Action Issued in U.S. Appl. No. 14/854,558", dated Apr. 27, 2018, 37 Pages.
"Oral Hearing Issued in European Patent Application No. 16781604.0", dated May 29, 2019, 08 Pages.
"Summon to Attend Oral Proceedings Issued in European Patent Application No. 16781604.0", dated Aug. 16, 2019, 1 Page.
"Non Final Office Action Issued in U.S. Appl. No. 14/854,558", dated Jul. 1, 2019, 34 Pages.
International Search Report and Written Opinion for International Patent Application No. PCT/US2016/029904, dated Aug. 19, 2016, date of filing: Apr. 29, 2016, 10 pages.
"Second Written Opinion Issued in PCT Application No. PCT/US2016/029904", dated Nov. 4, 2016, 6 Pages.
International Search Report and Written Opinion for International Patent Application No. PCT/US2016/053643, dated Dec. 16, 2016, filing date: Sep. 26, 2016, 10 pages.
Katzer et al.: "Office 365 Administration Guide Enterprise", Jan. 4, 2014, Retrieved from the Internet: <URL:http://rd.springer.com/chapter/10.1007/978-1-4302-6527-6_8>, <Retrieved on Dec. 6, 2016>, 64 pages.
Application and Drawings for U.S. Appl. No. 14/854,558, filed Sep. 15, 2015, 34 pages.
International Preliminary Report on Patentability for International Patent Application No. PCT/US2016/029904, dated Jan. 31, 2017, date of filing: Apr. 29, 2016, 7 pages.
"Hybrid Identity", In White Paper, Retrieved on: Apr. 28, 2015, 36 pages.
Shinder, Thomas W. "Modern Datacenter Architecture Patterns—Hybrid Networking", Published on: Dec. 2, 2014, Available at: http://blogs.technet.com/b/privatecloud/archive/2014/12/02/modern-datacenter-architecture-patterns-infrastructure.aspx.

"Cloud Computing System Architecture Diagrams", Published on: Jan. 25, 2012, Available at: https://support.rightscale.com/12-Guides/Designers_Guide/Cloud_Solution_Architectures/Cloud_Computing_System_Architecture_Diagrams/.
"Cross-Origin Resource Sharing (CORS)", Published on: Dec. 28, 2014, Available at: https://cloud.google.com/storage/docs/cross-origin.
Vaile, et al., "Data Sovereignty and the Cloud", Published on: Jul. 2013, Available at: http://www.cyberlawcentre.org/data_sovereignty/CLOUD_DataSovReoprt_Full.pdf.
Simms, et al., "Best Practices for the Design of Large-Scale Services on Azure Cloud Services", Published on: Apr. 17, 2014, Available at: https://msdn.microsoft.com/en-us/library/azure/jj717232.aspx.
Agrawal, et al., "Managing Geo-replicated Data in Multi-datacenters", In Proceedings of 8th International Workshop on Databases in Networked Information Systems, Mar. 25, 2013, 21 pages.
Ye, et al., "A Two-layer Geo-cloud based Dynamic Replica Creation Strategy", In Journal of Applied Mathematics & Information Sciences, vol. 8, No. 1, Jan. 1, 2014, pp. 414-440.
"Docave Administrator for Microsoft® Sharepoint® Administration", Published on: Apr. 7, 2015, Available at: http://www.avepoint.com/assets/pdf/doc6/DocAve_Administrator_for_SharePoint_Administration.pdf.
"AvePoint Releases New Features to Enhance On-Premises, Cloud & Hybrid Microsoft SharePoint Environments with DocAve 6", Published on: Feb. 10, 2015, Available at: http://www.avepoint.com/news-releases/2015/02/10/avepoint-releases-new-features-to-enhance-on-premises-cloud-hybrid-microsoft-sharepoint-environments-with-docAve6/.
"VMware Master Hybrid Cloud Management with VMware vRealize Suit", Published on: Jul. 9, 2014, Available at: https://www.vmware.com/files/pdf/management/VMware-Management-Brochure.pdf.
"The Power of a Flexible Platform Private, Public, or Hybrid Cloud", Published on: Feb. 9, 2015, Available at: https://www.egnyte.com/how-enterprise-file-services-works.html.
"Manage Multiple Clouds with Vistara", Published on: Apr. 6, 2015, Available at: http://www.vistarait.com/solutions/cloud/.
Chen, et al., "SDNBroker: Heterogeneous Cloud Serving Systems over Software-Defined Networking", In Proceedings of International Conference on Computer, Information and Telecommunication Systems, Jul. 7, 2014, 5 pages.
Breiter, et al., "A Framework for Controlling and Managing Hybrid Cloud Service Integration", In Proceedings of IEEE International Conference on Cloud Engineering, Mar. 25, 2013, pp. 217-224.
Araujo, et al., "Hybrid Cloud Integration and Monitoring with IBM WebSphere Cast Iron", Published on: Dec. 2012, Available at: http://www.redbooks.ibm.com/redbooks/pdfs/sg248016.pdf.
"Unified Communication and Collaboration Managed Services Hybrid Managed Service", Retrieved on: Apr. 27, 2015, Available at: http://www.avanade.com/~/media/documents/resources/bts/hybrid-managed-service-brochure.pdf.
Vecchiola, et al., "Aneka—Integration of Private and Public Clouds", In Proceedings of Cloud Computing Principles and Paradigms, Jan. 2011, 26 pages.
"Final Office Action Issued in U.S. Appl. No. 14/854,558" dated Nov. 7, 2019, 39 Pages.
"Summons to Attend Oral Proceedings Issued in European Patent Application No. 16725636.1", dated Oct. 31, 2019, 6 Pages.
"Office Action Issued in European Patent Application No. 16781604.0", dated Nov. 27, 2019, 14 Pages.

* cited by examiner

CROSS-DATA CENTER INTEROPERATION AND COMMUNICATION

BACKGROUND

Computer systems are currently in wide use. Some computer systems host services in a remote server environment, such as in the cloud.

Some organizations that use such computer systems have multiple different data centers, deployed in the remote server environments, that host their data and services. Data and services can be hosted in multiple different data centers, for a variety of different reasons. For instance, some data and services are hosted in different data centers, based upon the geographical location of those data centers. As an example, it may be that some organizations have an office in North America and in Europe. It may also be that the organization may wish the data for the North America location to be hosted in North America, and the data for the European location to be hosted in Europe. Thus, the organization may use both a North American data center and a European data center to host its data and services.

Currently, such organizations set up a separate organizational presence, and a separate user experience, within each data center. Therefore, even if the same service is implemented in two different data centers for the same organization, the organizational presence and the user experience may differ based on the particular data center that is hosting the service for the organization. In addition users must know which specific instance of a service to log into when accessing their resources.

The discussion above is merely provided for general background information and is not intended to be used as an aid in determining the scope of the claimed subject matter.

SUMMARY

Users in a given organization are tagged with a data center identifier (or data location) that identifies a data center where the user's resources are located. A user request is detected, that indicates that the user wishes to access a resource that is tied to the user. The user is automatically navigated to the user's corresponding data center, where the user permissions are analyzed to selectively grant access to the requested resource.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
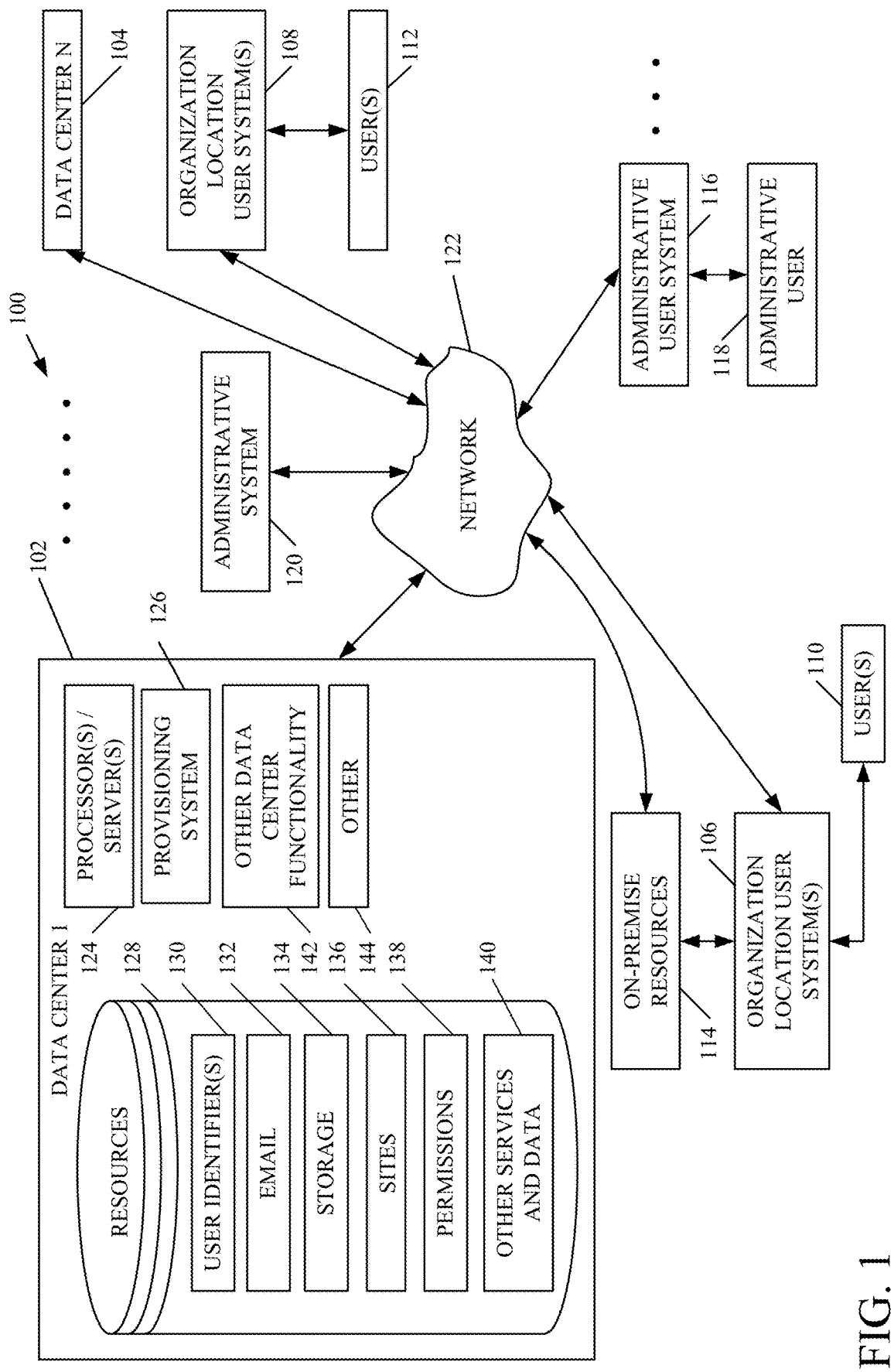
FIG. 1 is a block diagram of one example of a multi-data center architecture.

FIG. 1 is a block diagram of one example of a multi-data center architecture 100. Architecture 100 shows that a given organization has resources (such as data and services) hosted on a plurality of different data centers 102-104. In the example shown in FIG. 1, the organization also has a plurality of different organizational locations where organization user systems 106-108 are deployed. Each user system has one or more users 110-112, respectively, that access the services and data hosted on data centers 102-104, through systems 106-108. FIG. 1 also shows that, in one example, the users can access one or more on-premise resources 114 as well.

In the example shown in FIG. 1, architecture 100 also includes an administrative user system 116 that is accessed by an administrative user 118. Administrative user 118 uses system 116 to access an administrative system 120 in order to setup users on the various data centers 102-104, and in order to allow provisioning of data centers, resources (e.g., services, data, user accounts, etc.) on the various data centers 102-104. In one example, systems 106-108 and 116 access data centers 102-104 and system 120 through network 122. Data centers 102-104 and/or administrative system 120 can be deployed in a remote server environment, such as in the cloud. One example of this is described below with respect to FIG. 7. Also, in the example shown in FIG. 1, each data center 102-104 illustratively has one or more processors or servers 124, a provisioning system 126, and a set of hosted resources 128. Resources 128, themselves, can include permissions that incorporate user identifiers 130, that are consistent across all data centers for the organization and which may include various users accounts and identify the organization the user belongs to, email systems 132, data storage 134, various organizational sites 136, user permissions 138, and other services and data 140). Each data center 102-104 may also illustratively include a wide variety of other data center functionality 142 that can be used by the corresponding data center to host the services and data for the users of an organization. In multi-tenant deployment, the data centers host multi-tenant services and data for a plurality of different tenants, each corresponding to a different organization. Each data center 102-104 can include other items 144, as well.

Before describing the operation of architecture 100 in more detail, a brief overview will first be provided. Administrative user 118 can illustratively use system 120 to configure data centers for an organization. This can include, for instance, selecting data centers, adding new data centers, setting data restrictions, etc. In one example, the administrative user 118 only selects a data center location. However, the FIGS. 3A-3G also show an example in which the administrative user 118 can also select data restrictions, etc., although these are only shown as being selectable, as one example. When a user of the organization that is using architecture 100 is to be added to the system, administrative user 118 illustratively accesses administrative system 120 to identify a particular data center 102-104 that the new user will be associated with. This can be based on a wide variety of different criteria, such as the particular region where the user is employed and works, among others. When administrator 118 (or a different administrator) then provisions resources for the new user, administrative system 118 illustratively automatically redirects the administrator to the particular data center 102-104 where the resources are to be provisioned. By automatically it is meant that the operation is performed without any other user input, except perhaps to initiate or confirm the operation. The provisioning system 126 in that particular data center is then used to provision services, data, storage, etc., for the user. It can also be used to set permissions 138 for the user, to set up user accounts using user identifiers 130, etc.

During runtime, when a user 110-112 wishes to access a hosted resource, administrative system 120 identifies the tag associated with the user and redirects the user to the appropriate data center, where permissions 138 are checked to selectively provide the user with access to the requested resources, based upon the user's permissions. Also, when allowed by administrative system 120, a user can illustratively perform a search across multiple data centers 102-104 so that data, people, etc., from those data centers can be surfaced, if the user has permission to view the surfaced information.

Figure 2:
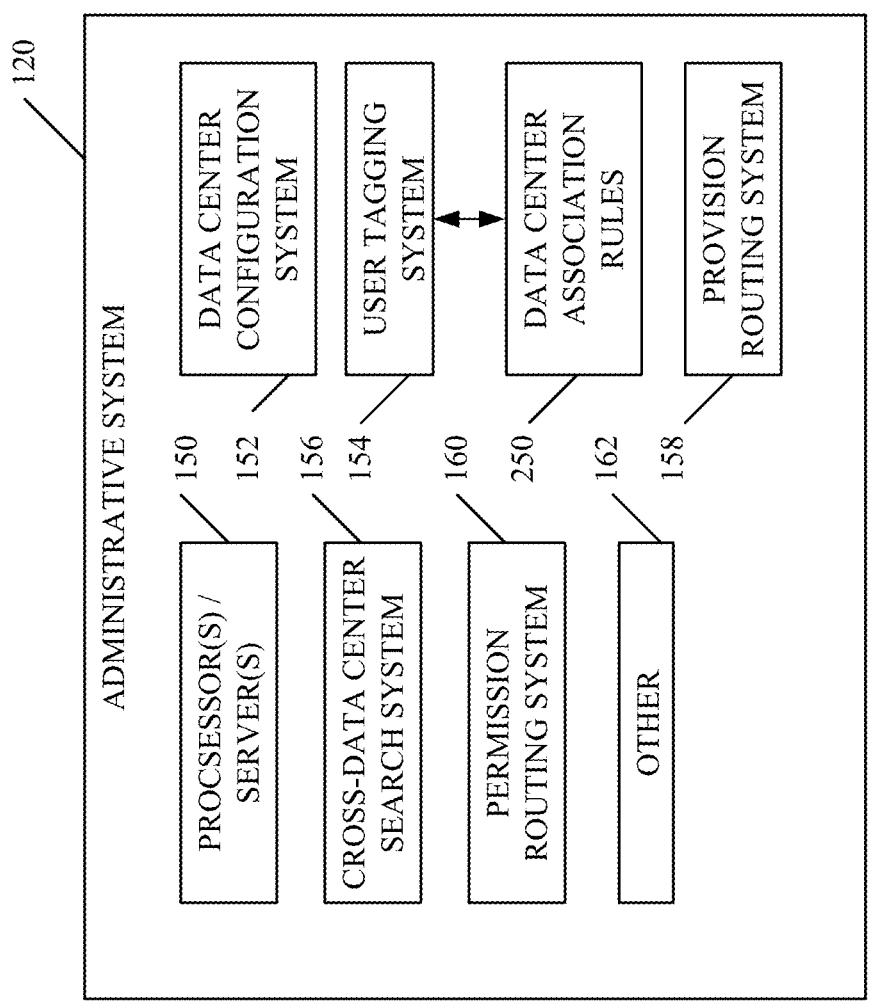
FIG. 2 is a block diagram of one example of an administrative system that can be used in the architecture shown in FIG. 1.

FIG. 2 is a block diagram of one example of administrative system 120. In the example shown in FIG. 2, system 120 illustratively has one or more processors or servers 150, a data center configuration system 152, user tagging system 154, cross-data center accessing system 155 (which can include cross-data center search system 156, provision routing system 158, user tag identifier component 159 and permission routing system 160), and data center association rules 250. It can include a wide variety of other items 162 as well. Administrative user 118 can access data center configuration system 152 to configure a data center (such as to add a data center location for the organization, to configure the data access rules at that location, etc.). User tagging system 154 is used to generate a tag for a user, that associates the user with the organization and one or more data centers. In doing so, it can access rules 250 which can identify a data center to associate with the user based on any of a wide variety of criteria, such as user location, user role, the resources that the user will use, etc. Cross-data center search system 156 employs a set of cross-data center access rules to conduct searches for users 110-112. Provision routing system 158 illustratively routes the administrative user to a given data center, so that the user can provision resources for a user, at the data center that is associated with that user through the user's tag. Permission routing system 160 illustratively routes resource access requests from a given user, to the permission system, that enforces the permissions assigned to that user, in the data center associated with that user.

Figure 3:
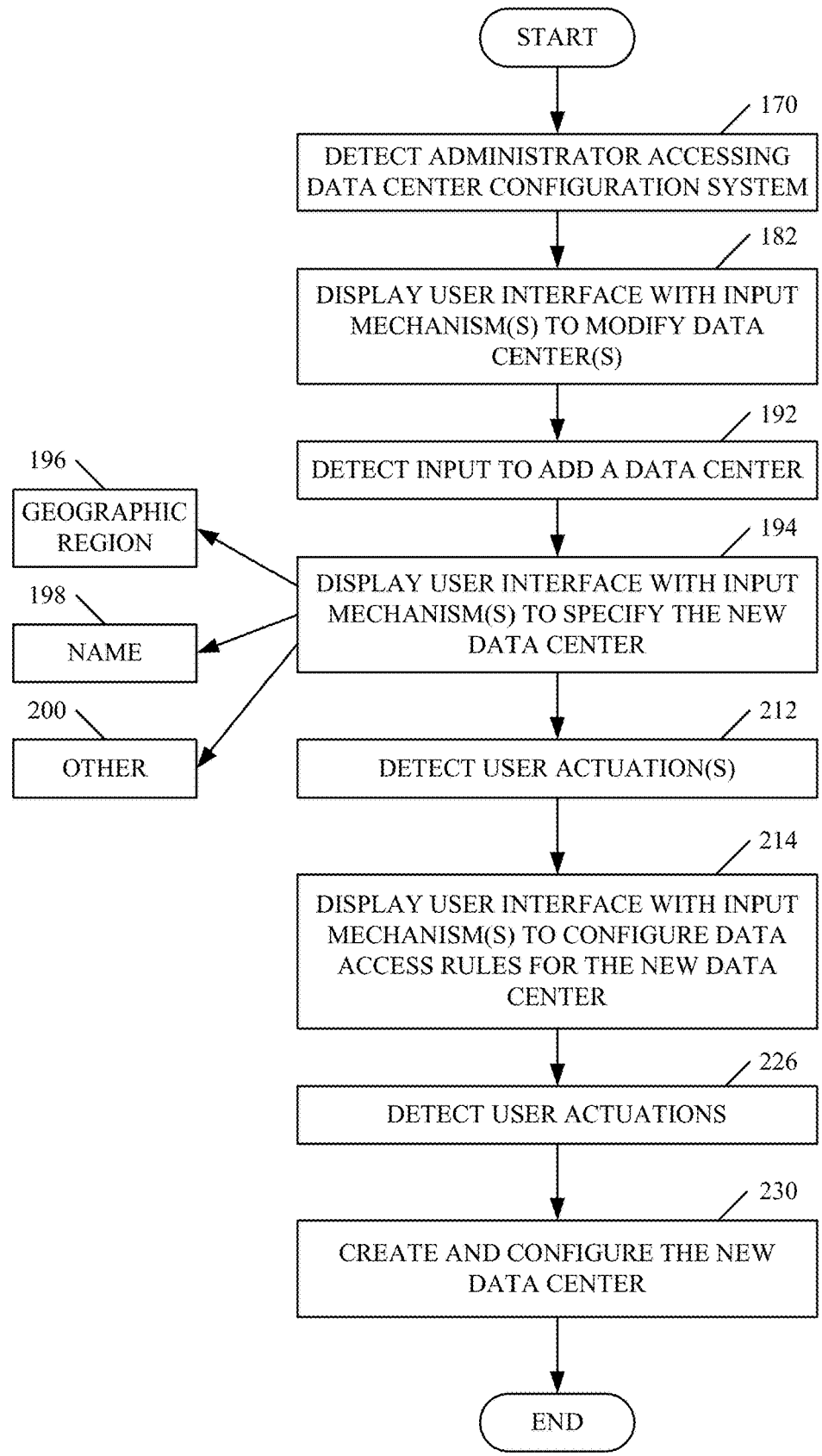
FIG. 3 is a flow diagram illustrating one example of the operation of the administrative system, in configuring a data center for an organization.
Figure 3A:
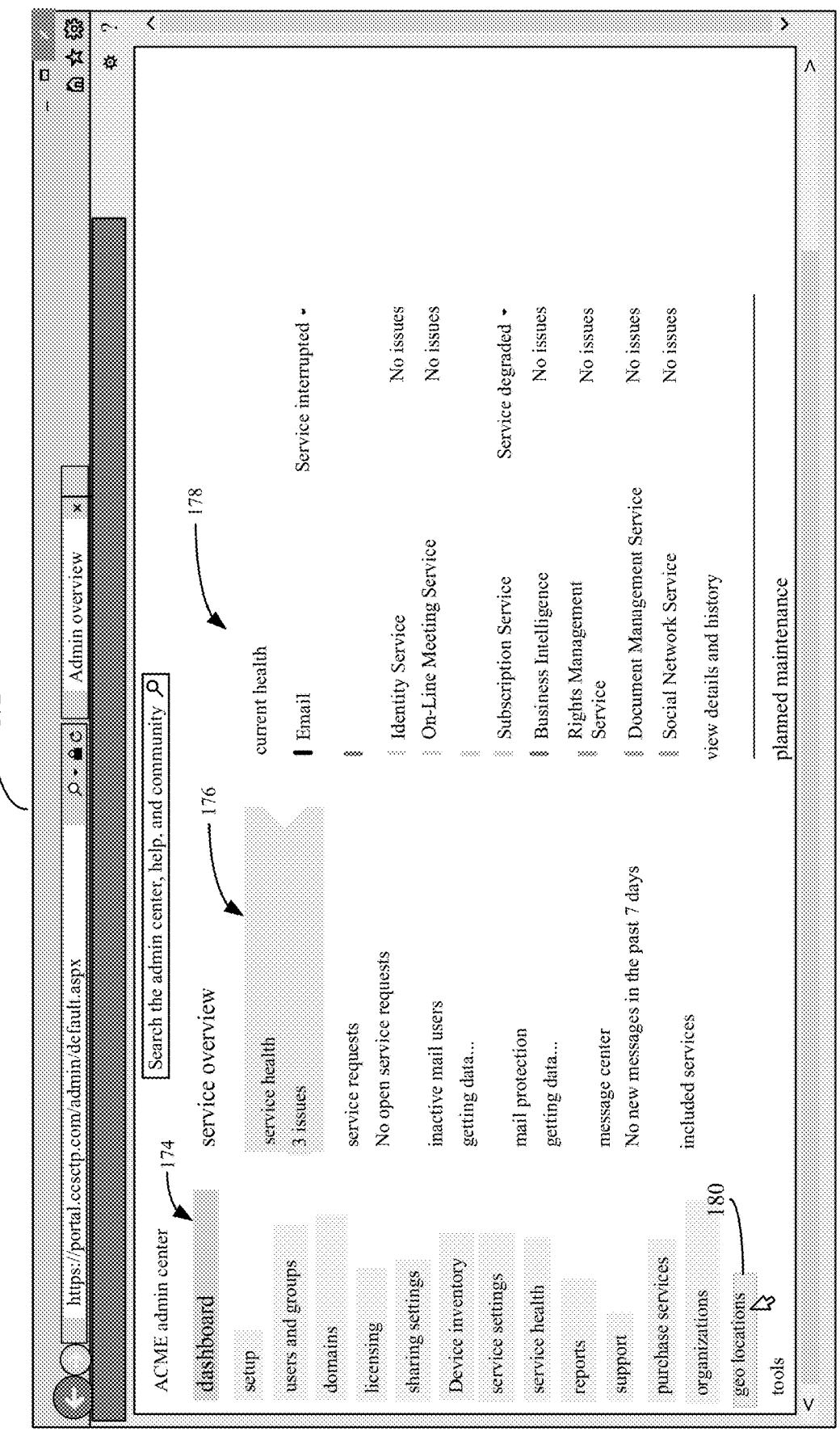
FIGS. 3A-3G show examples of user interface displays.

FIG. 3 is a flow diagram illustrating one example of the operation of architecture 100 in allowing administrative user 118 to configure a data center for the organization. In the example shown in FIG. 3, administrative user 118 is adding a data center location for the organization, and configuring data access rules. It will be noted, however, that this is an example only. Administrative user 118 can configure data centers in other ways as well. FIGS. 3A-3G are examples of user interface displays that can be generated for administrative user 118 during the configuration operation. FIGS. 1-3G will now be described in conjunction with one another.

Data center configuration system 152 first detects an administrator input indicating that administrative user 118 is accessing the data center configuration system 152. This is indicated by block 170 in FIG. 3. In one example, for instance, administrative system 120 can control a user interface display device to display a user interface, such as user interface 172 shown in FIG. 3A. User interface 172 is illustratively a dashboard display that includes a set of selectable elements 174 that allow the administrative user to perform tasks, as well as a service overview display 176, a health display 178, and it can include a wide variety of other or different things. In the set of user selectable elements 174, it can be seen that the user is selecting a selectable element 180 that corresponds to the geographical locations for the organization that the administrative user 118 is administering.

Figure 3B:
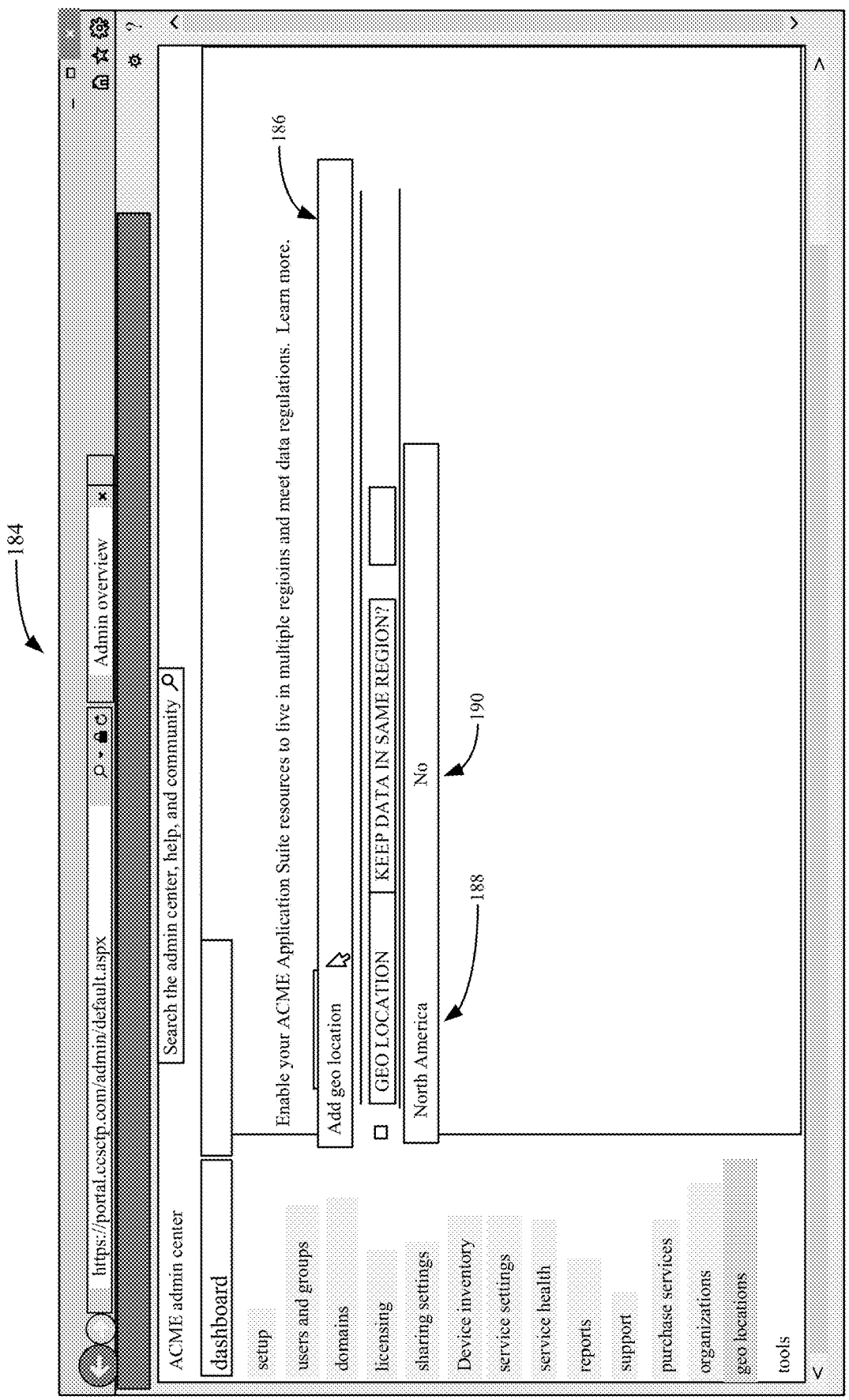

In response, system 152 displays a user interface with user input mechanisms that allow the administrative user 118 to modify or otherwise configure a data center for the organization. This is indicated by block 182 in the flow diagram of FIG. 3. FIG. 3B shows one example of this.

User interface display 184 shows that system 152 has now controlled the user interface display device to display a selectable user input mechanism 186 that allows the user to add a data center in a new geographical location. The example shown in FIG. 3B shows that user interface 184 is also showing a set of existing data centers generally at 188, and a set of data access rules corresponding to each data center is generally indicated at 190. For instance, the data access rules corresponding to the North America data center shown in FIG. 3B indicate that data from that data center need not be kept in the same geographical region. Thus, the data can be moved or transported to other data centers in other geographical locations.

System 152 then detects a user input to add a data center for the organization. This is indicated by block 192 in the flow diagram of FIG. 3. For instance, the user can click, or otherwise actuate the user input element 186 indicating that the user wishes to add a data center in a new geographical location.

Figure 3C:
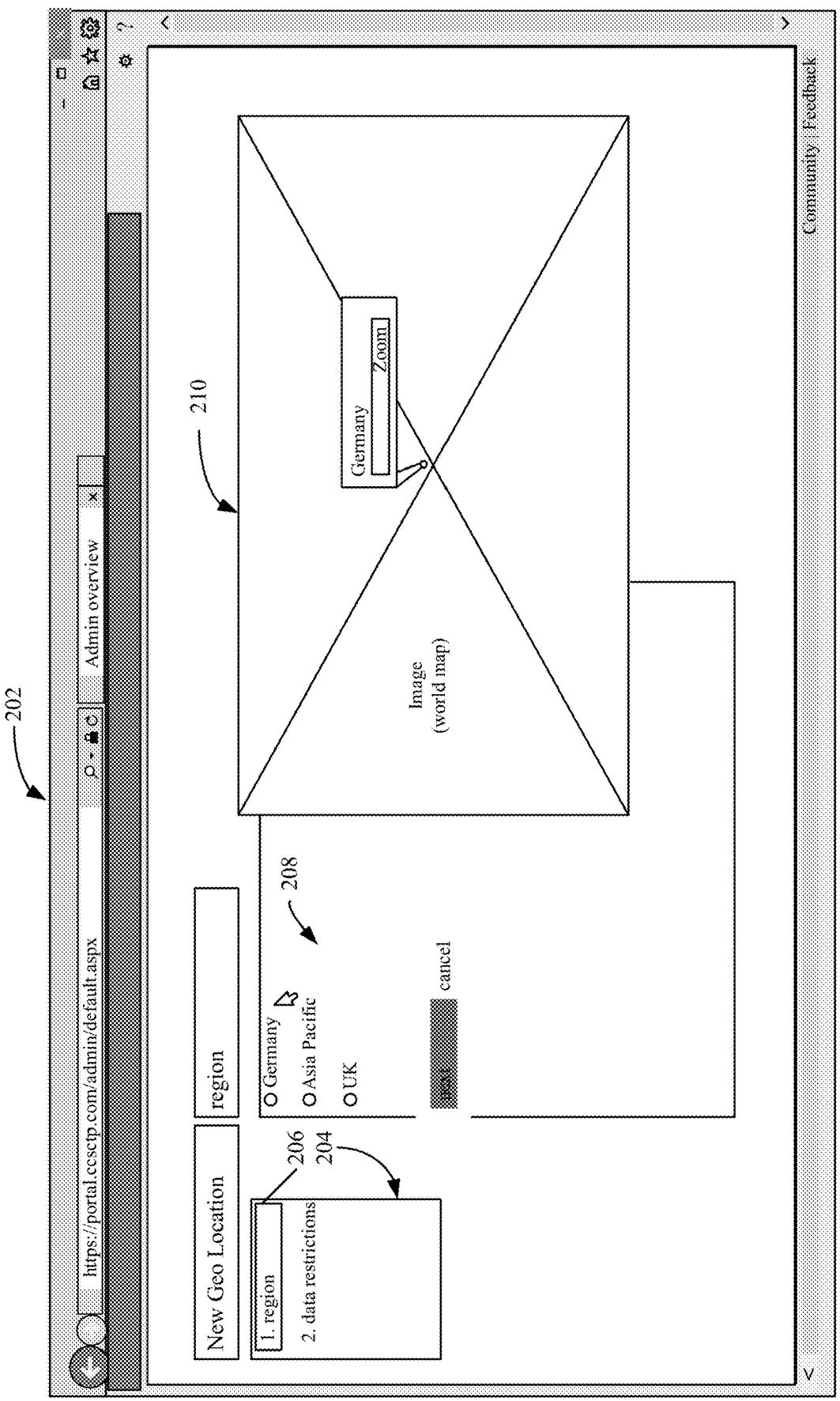
Figure 3D:
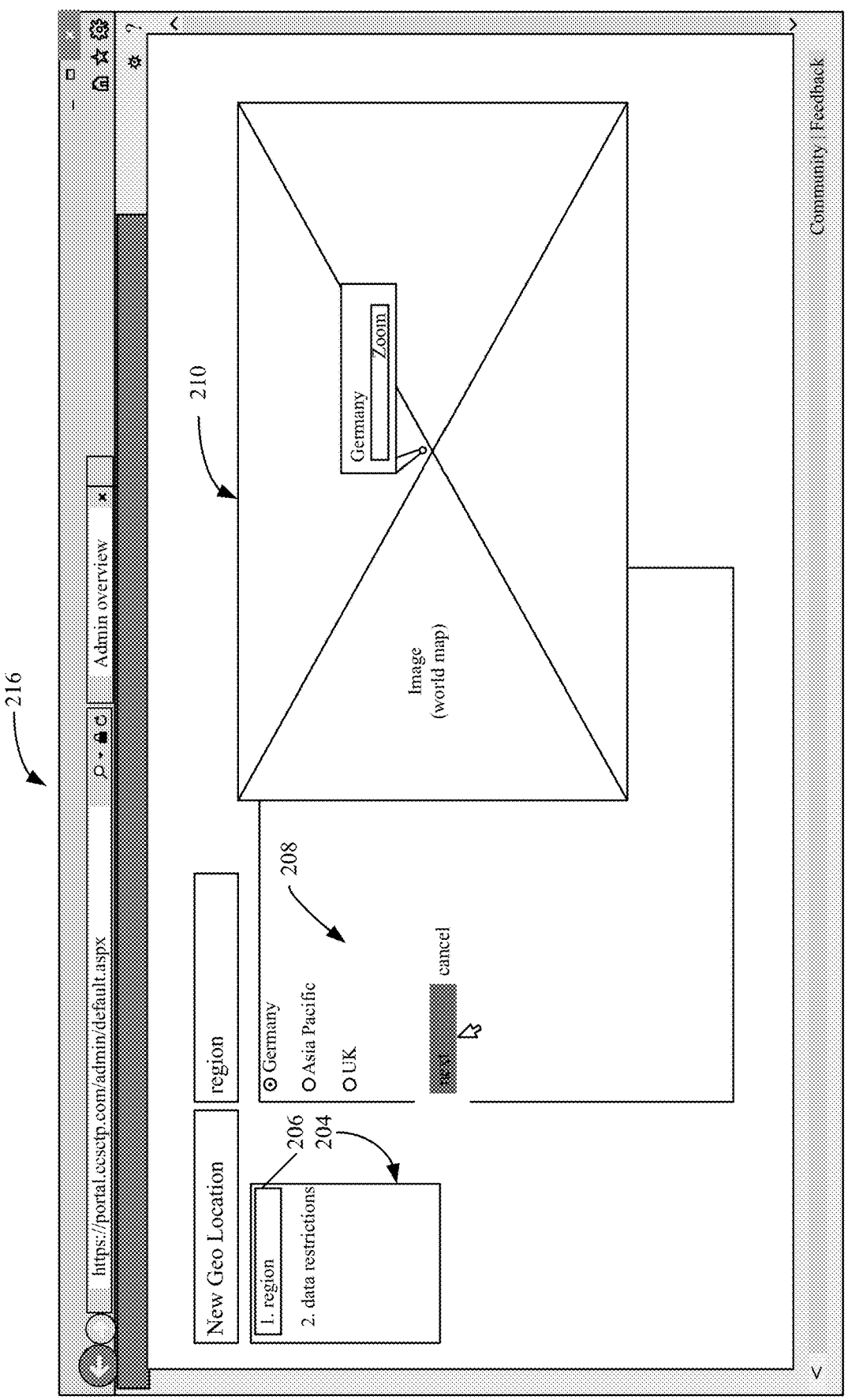
Figure 3E:
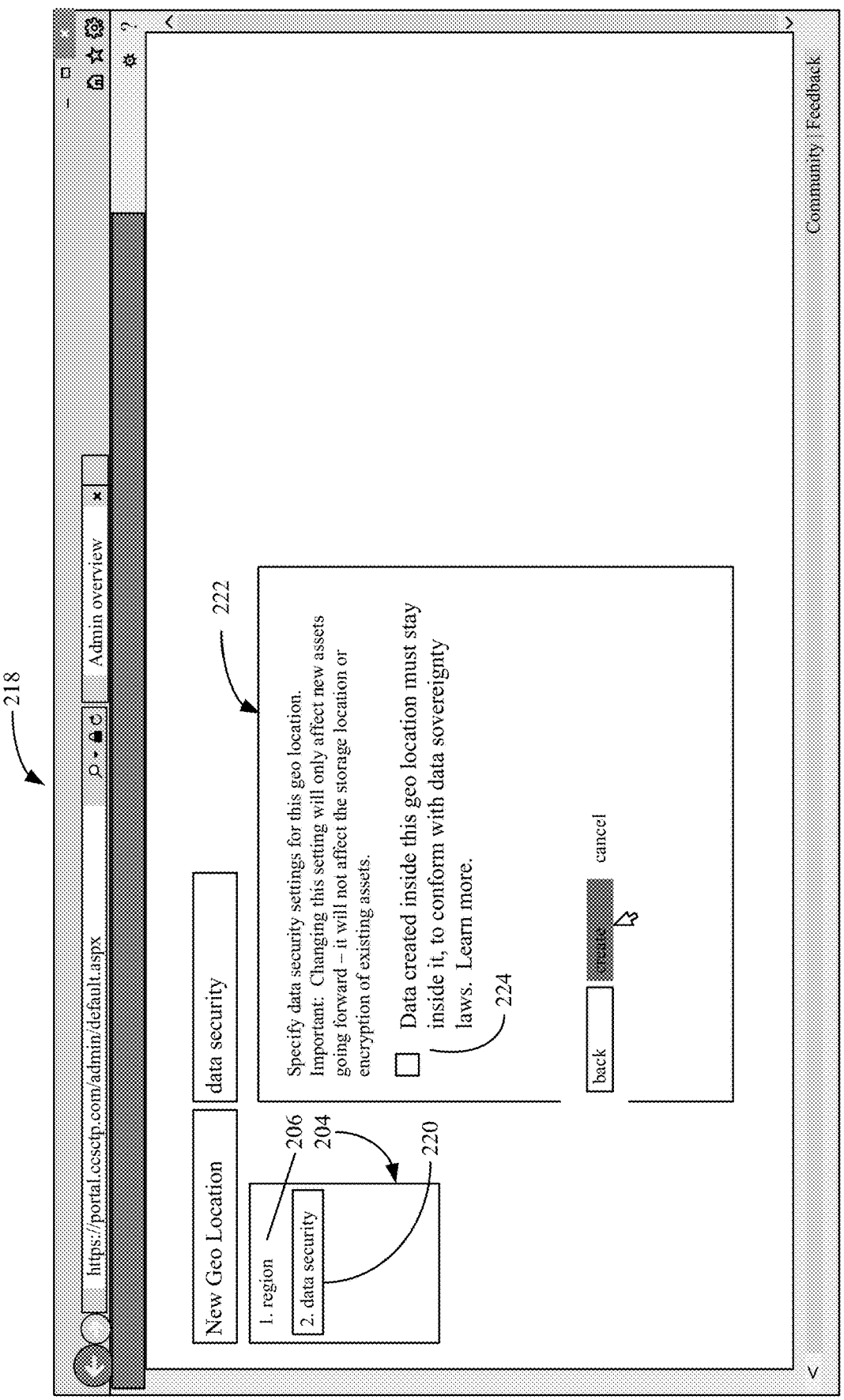

In response, data center configuration system 152 displays a user interface with input mechanisms to specify the data center. This is indicated by block 194 in FIG. 3. For instance, the user input mechanisms can allow the administrative user 118 to select a geographic region 196 where the new data center will be located, to provide a name 198 for the new data center and to provide other specifying information 200. FIG. 3D shows an example of a user interface 202 that indicates this.

Display 202 illustratively displays user input mechanisms 204 that allow a user to either select a geographic region (with mechanism 206) in which to add a data center or to configure data restrictions (with mechanism 206) in a selected data center. In FIG. 3C, the user has selected the region user input mechanism 206. Therefore, display 202 also includes a data center display 208 that displays geographic regions where data centers can be added. Also, in the example shown in FIG. 3C, a map display 210 is shown as well.

Data center configuration system 152 then detects user actuation of one of the user input mechanisms on display 202. This is indicated by block 212 in the flow diagram of FIG. 3. Once the user has selected a region where a data center is to be added, system 152 displays a user interface with input mechanisms that allow the user to configure the data access rules for the new data center. This is indicated by block 214. FIG. 3D shows one example of a user interface display 216 that indicates this.

Some of the items in FIG. 3D are similar to those shown in FIG. 3C, and they are similarly numbered. It can be seen in FIG. 3D that the user has actuated the "Germany" user input mechanism identifying Germany as a location where the new data center is to be added. In response, system 152 displays user interface display 218 shown in FIG. 3E. It can now be seen that processing has moved to configuring the data security rules for the new data center. User input mechanism 220 is highlighted to indicate this. System 152 thus displays a data security display portion 222 that includes user input mechanisms that allow the user to configure the data security rules for the new data center. For instance, the example shown in FIG. 3E includes user input mechanism 224 in the form of a check box. If the user checks this, this will activate rules that force data created inside the new data center to stay inside it during subsequent accessing operations.

Figure 3F:
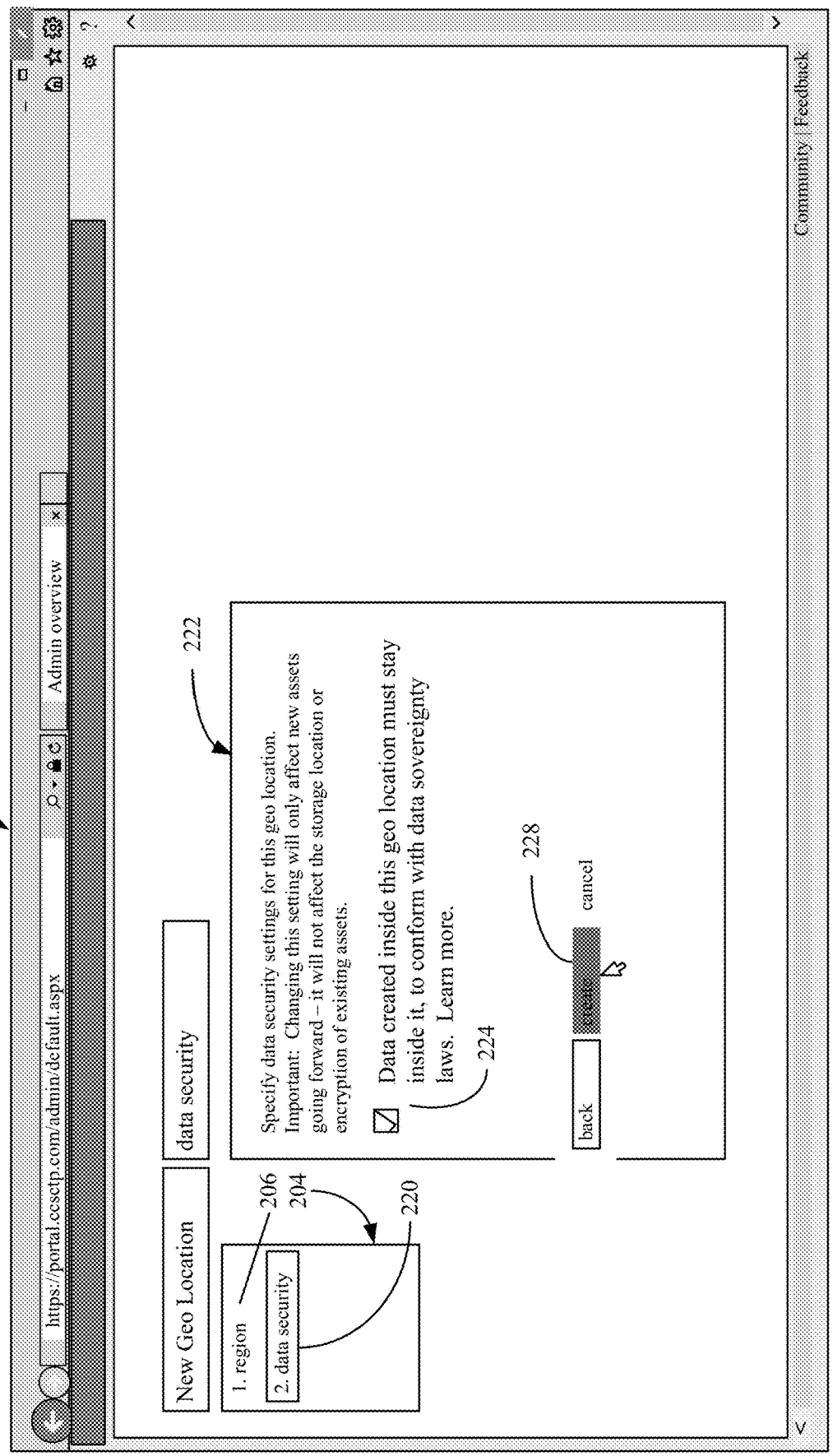

System 152 then detects user actuation of the user input mechanisms. This is indicated by block 226 in the flow diagram of FIG. 3. FIG. 3F, for instance, shows that the user has actuated user input mechanism 224, to set the data access rules for the newly added data center. The user then actuates a suitable user input mechanism, indicating that the new data center should be created. FIG. 3F, for example, shows that the user can actuate "create button" 228. In response, system 152 illustratively creates and configures the new data center in the specified geographic location, with the identified data restrictions (or data access rules). This is indicated by block 230 in the flow diagram of FIG. 3.

Figure 3G:
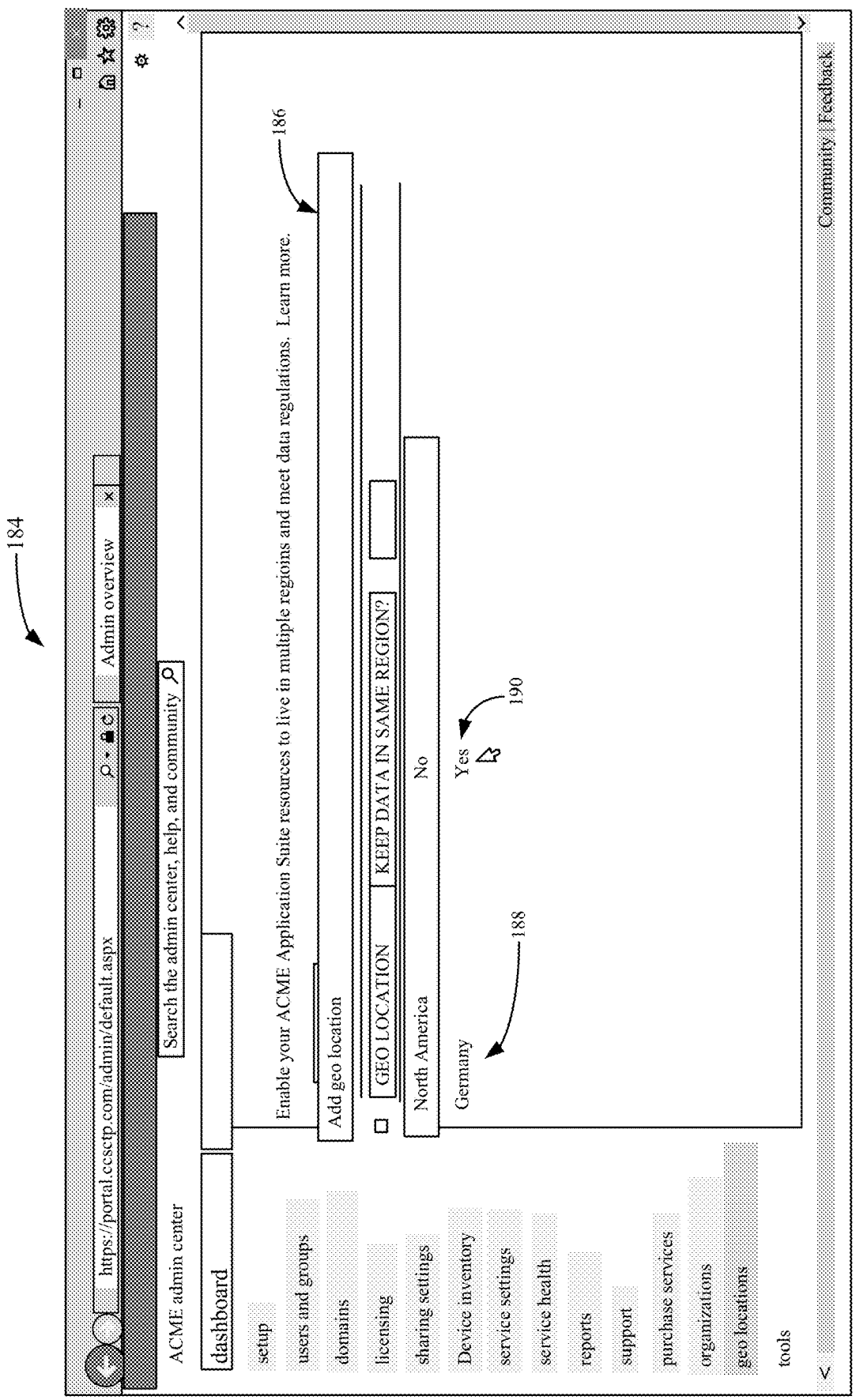

System 152 can illustratively generate a display showing the newly created data center. For instance, FIG. 3G shows user interface display 184 (which is similar to that shown in FIG. 3B). However, display 184 now shows that the new geographic location 188 for the new data center is in Germany. It also identifies the new data access rules 190 for the new data center, as indicating that data created there, must stay there.

It will be noted that the administrative experience for creating or configuring a data center can vary widely. The experience described above with respect FIGS. 3-3G is one example only.

Figure 4:
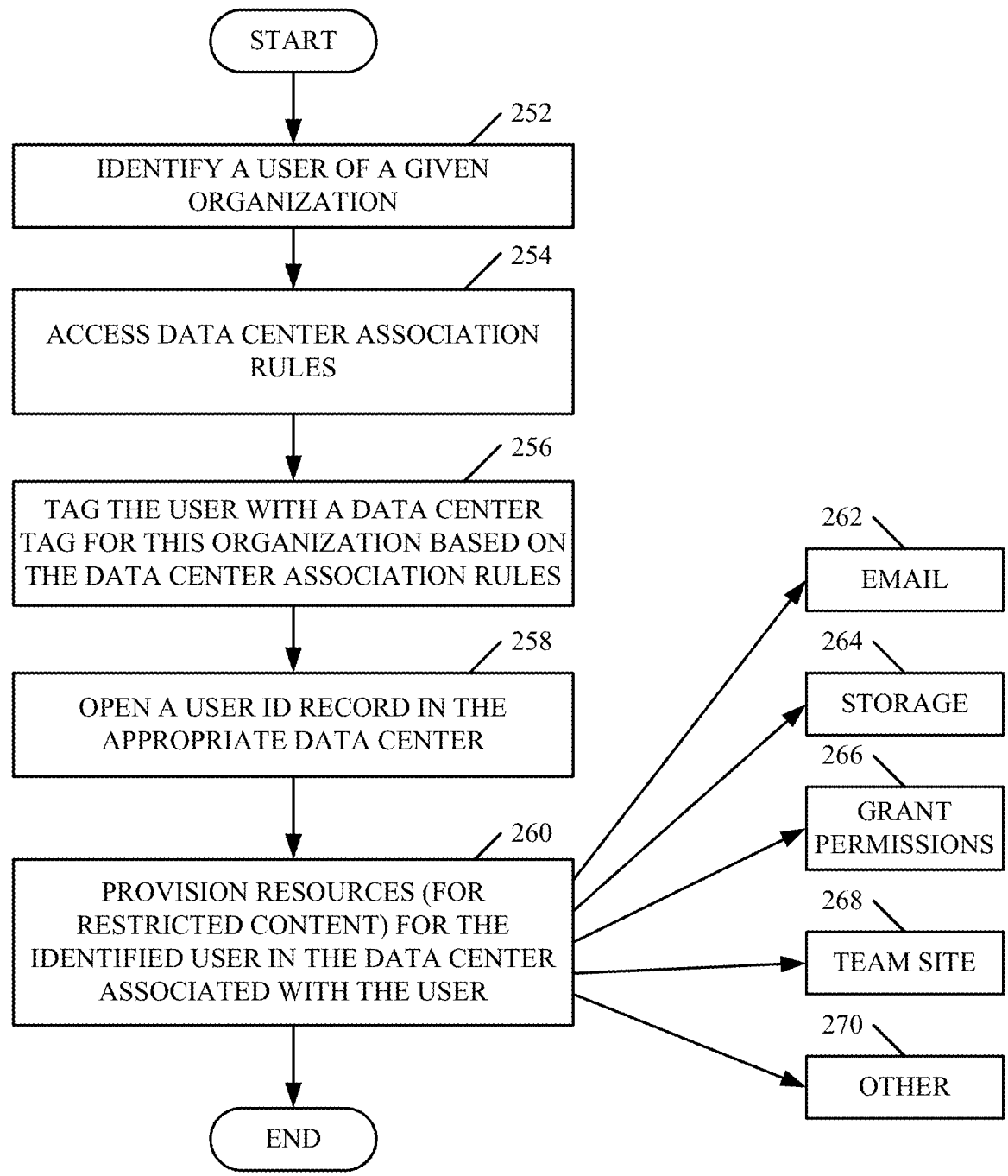
FIG. 4 is a flow diagram illustrating one example of the operation of the administrative system in setting up a user in a data center.

FIG. 4 is a flow diagram illustrating one example of the operation of administrative system 120 in allowing administrative user 118 to setup a new user for an organization. User tagging system 154 first detects that administrative user 118 is identifying a user that is to be added to the organization, and associated with a particular data center. In one example, user tagging system 154 accesses data center association rules 250 to identify a particular data center 102-104 that the new user is to be associated with. Again, this may be based on the geographic location of the user, based on data sovereignty laws, based upon the role or security permissions that will be associated with the user (e.g., the organization may keep some data, such as highly secure data, in one data center and other data, such as less critical data, in another data center, regardless of geographical location), or other things. Identifying the user for a given organization and accessing the data center association rules are indicated by blocks 252 and 254 in FIG. 4.

User tagging system 154 then tags the user with a data center tag (for this organization) based upon the data center association rules. This is indicated by block 256. The tag will be associated with the user, and will indicate a certain data center that the user is associated with. It will be appreciated that the tag can be specified directly by administrative user 118 as well. Therefore, instead of tagging system 154 automatically tagging the user based on data center association rules 250, it may be that administrative user 118 already knows the data center that the user is to be associated with. Thus, the administrative user 118 can directly provide the tag as well.

Administrative system 120 then opens a user ID record in the appropriate data center, for the new user. This is indicated by block 258. Provision routing system 158 then allows administrative user 118 to provision resources for the identified user in the data center associated with that user. This is indicated by block 260. In one example, resources can be provisioned for restricted content, to which the data restriction rules apply. The resources can also be provisioned for other data and services that are unrestricted. By way of example, administrative user 118 can provision email services 262, or data storage 264, set up permissions as indicated by block 266, associate the user with team sites or other sites as indicated by block 268, or provision a wide variety of other resources 270.

Figure 5:
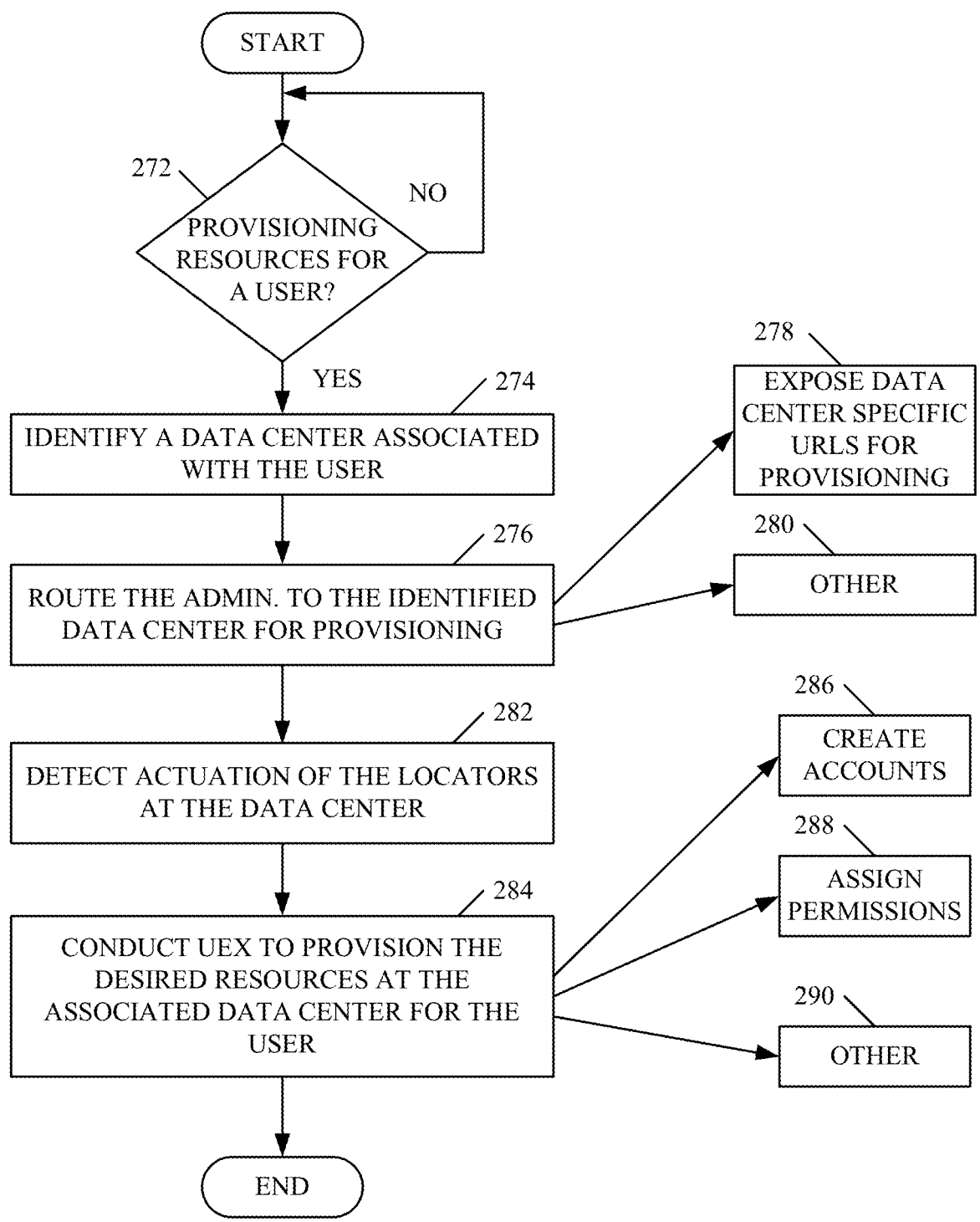
FIG. 5 is a flow diagram illustrating one example of the operation of the architecture shown in FIG. 1 in provisioning resources on a data center.

FIG. 5 shows one example indicating how administrative system 120 allows administrative user 118 to provision resources, in more detail. Provision routing system 158 first determines that an administrative user 118 is attempting to provision resources for a user. This is indicated by block 272 in FIG. 5.

Provision routing system 158 then identifies a data center associated with the user. For instance, it can access the tag corresponding to the user or identify the data center in other ways as well. Identifying the data center associated with the user is indicated by block 274 in FIG. 5.

Provision routing system 158 then reroutes the administrative user 118 to the identified data center, and the provisioning system 126 in that data center allows administrative user 118 to provision resources for the user. This is indicated by block 276. In one example, system 158 exposes data center-specific URLs for provisioning resources at the identified data center. This is indicated by block 278. It can redirect the administrative user 118 in other ways as well, and this is indicated by block 280.

When the user actuates the locators (e.g., the URLs), the user is navigated to the provisioning system 126 at the identified data center. That provisioning system 126 then conducts a user experience (UEX) to provision the desired resources, at the associated data center, for the user. Detecting actuation of the URLs and conducting the UEX are indicated by blocks 282 and 284, respectively. In one example, the UEX can allow the administrative user to create various accounts 286 for the user, at the associated data center. It can allow the administrative user 118 to assign permissions 288, and perform a wide variety of other provisioning steps and user setup steps as indicated by block 290.

Figure 6:
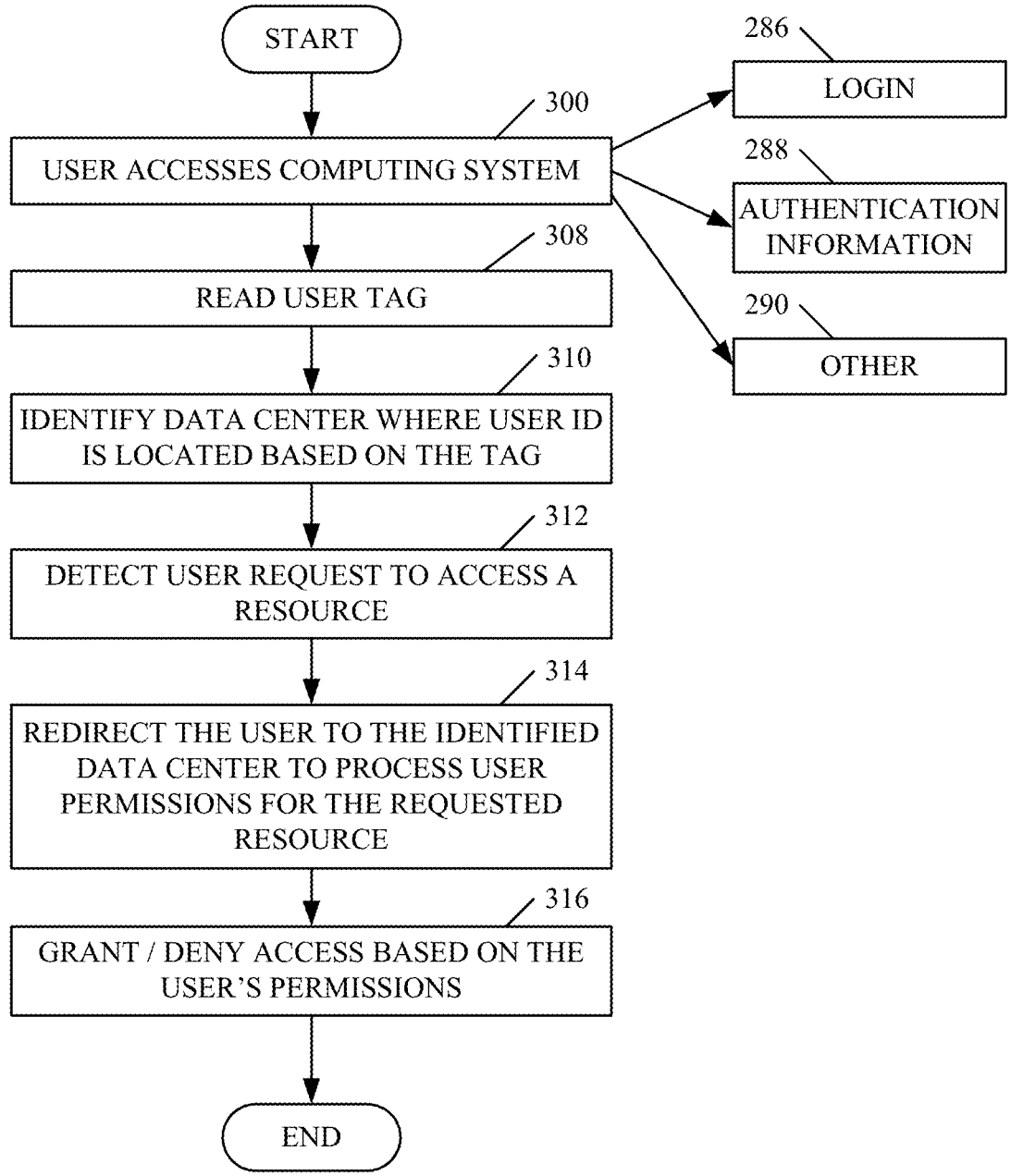
FIG. 6 is a flow diagram illustrating one example of a user experience in using the architecture shown in FIG. 1.

FIG. 6 is a flow diagram illustrating one example of the operation of the architecture shown in FIG. 1, in allowing a user to access resources, once the user has been setup within the architecture, and once resources have been provisioned at an associated data center, for that user. A user (for the sake of the present description, it will be user 110) first accesses the architecture shown in FIG. 1. This is indicated by block 300 in the flow diagram of FIG. 6. For instance, the user may log in as indicated by block 302, provide authentication information as indicated by block 304, or otherwise access the computing system as indicated by block 306. Administrative system 120 reads the tag corresponding to the user (which will follow the user ID). This is indicated by block 308. It identifies a data center where the user ID is located, based on the tag. This is indicated by block 310.

At some point, the user will request access to a resource. In response, permission routing system 160 (or another system) detects the user request to access a resource. This is indicated by block 312. It redirects the user to the identified data center, in order to process user permissions for the requested resource. This is indicated by block 314. For instance, the user's permissions 138 will illustratively be stored at the particular data center 102 associated with the user. Thus, permission routing system 160 automatically directs the request for resources to the data center 102 identified by the user's tag. The permission system at that data center accesses the associated permissions 138 in order to determine whether the user has access to the requested resources.

It will then be the permission system at the associated data center 102 that grants or denies access to the requested resources, based upon the user's permissions stored at that data center, and based upon the particular permission, policies, rules, or restrictions at that data center. This is indicated by block 316.

It can thus be seen that providing a global organizational presence, associated with each user, and providing a tag identifying a particular data center associated with the user, allows the user to be subjected to the data restriction policies of the user's associated data center, automatically. The user is automatically routed to that data center so that the permissions associated with the user can be applied in processing that user's requests for resources. Similarly, the data restrictions associated with the data center will be enforced, because the user is actually having his or her resource request processed by that data center. Since the user is automatically routed to the associated data center based on the user's tag and the global organizational presence, the user need not know which particular deployment (e.g., which particular service at which particular data center) to navigate to in order to access the data. Instead, the user's permissions and the data access restrictions will follow the user, no matter where the user is currently located, when the user attempts to access resources.

Similarly, the administrative user can easily setup and configure new data centers, with new data restriction policies or rules, and with different sets of permissions. Those restrictions, permissions, etc., will automatically follow the users who are associated with that data center. This increases the security of the system, overall, it ensures the system will operate properly (in that the data access restrictions will be complied with), and it makes both the user experience and the experience of the administrative user, much more efficient.

The present discussion has mentioned processors and servers. In one example, the processors and servers include computer processors with associated memory and timing circuitry, not separately shown. They are functional parts of the systems or devices to which they belong and are activated by, and facilitate the functionality of, the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
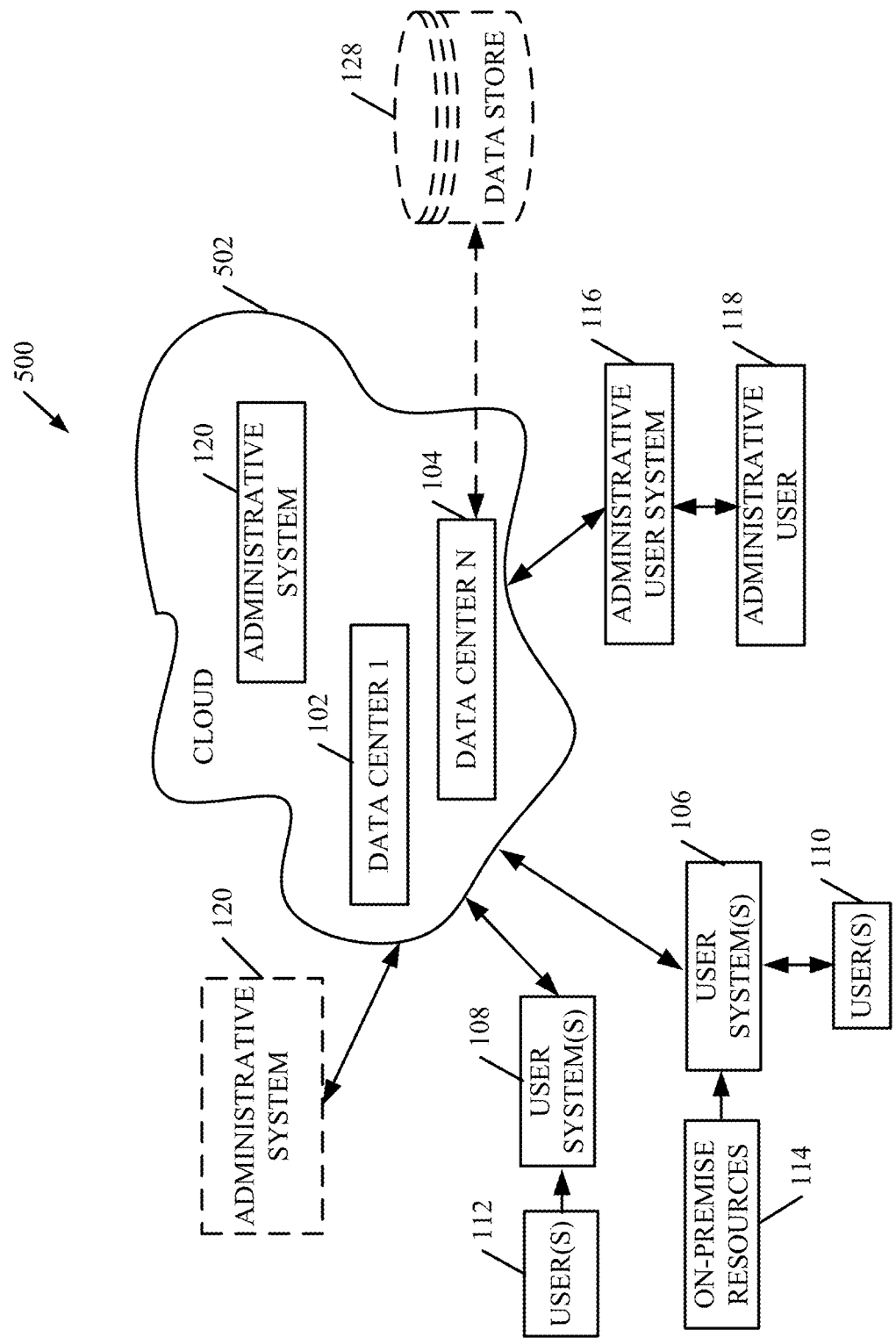
FIG. 7 is one example of the architecture shown in FIG. 1, more specifically implemented in a cloud computing architecture.

FIG. 7 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 7, some items are similar to those shown in FIG. 1 and they are similarly numbered. FIG. 7 specifically shows that multi-tenant data centers 102-104 and administrative system 120 can be located in cloud 502 (which can be public, private, or a combination where portions are public while others are private). Therefore, users 110-112 use user systems 106-108, and administrative user 118 uses system 116, to access those systems through cloud 502.

FIG. 7 also depicts another example of a cloud architecture. FIG. 4 shows that it is also contemplated that some elements of data centers 102-104 can be disposed in cloud 502 while others are not. By way of example, data stores 128 can be disposed outside of cloud 502, and accessed through cloud 502. In another example, administrative system 120 is also outside of cloud 502. Regardless of where they are located, they can be accessed directly by systems 110-112 and 116, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
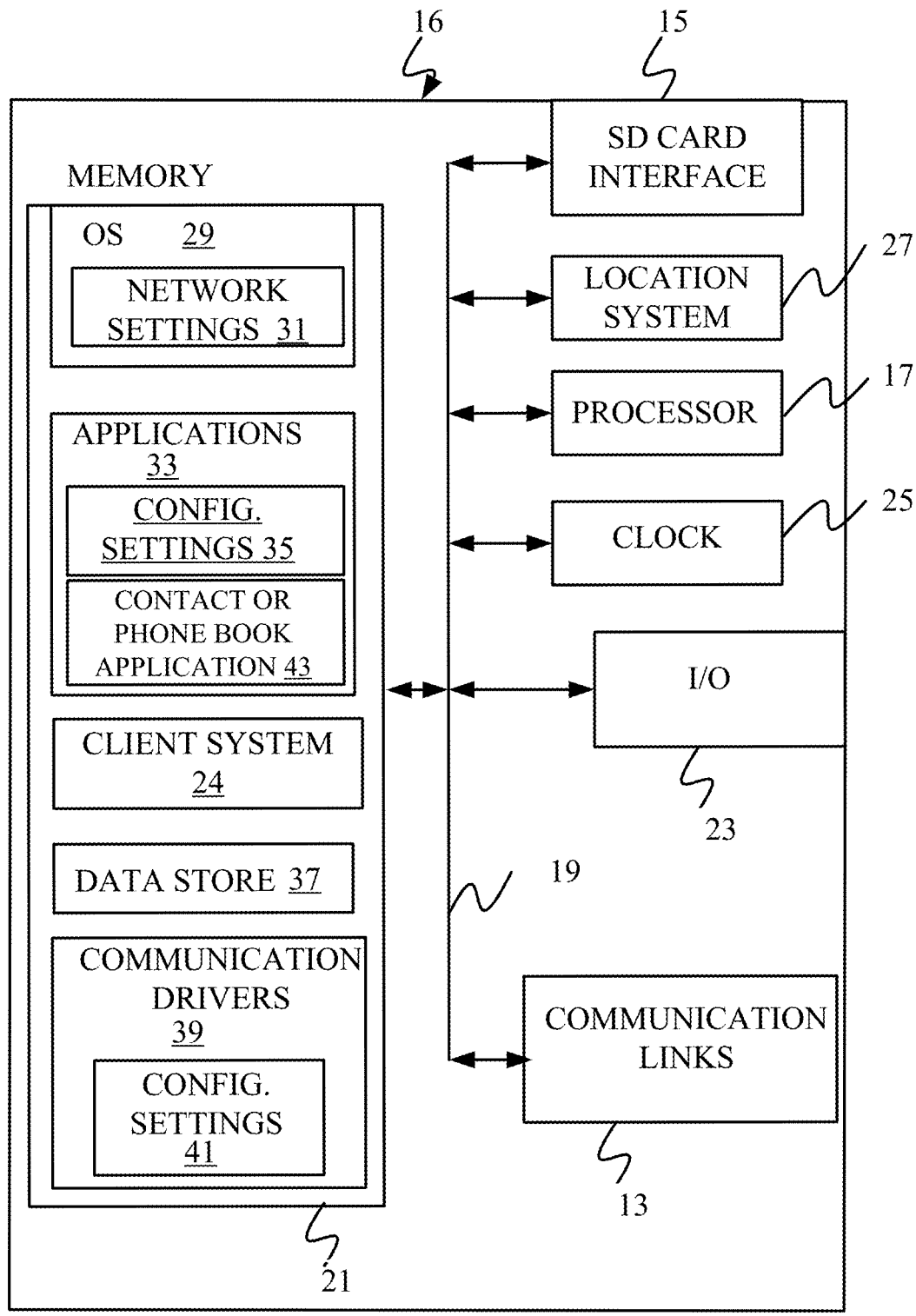
FIGS. 8-10 show examples of mobile devices that can be used in the architectures shown in the previous figures.
Figure 9:
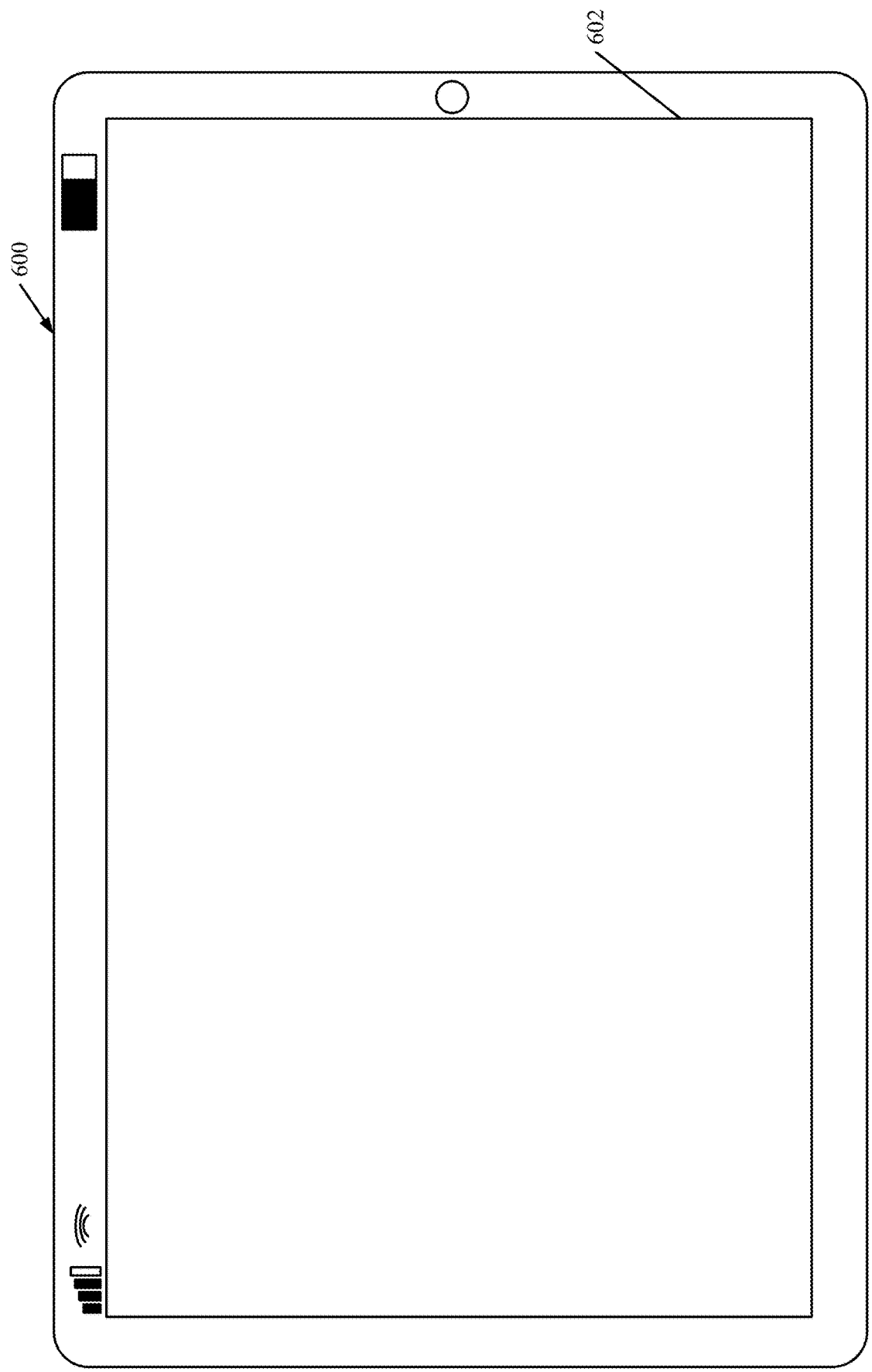
Figure 10:
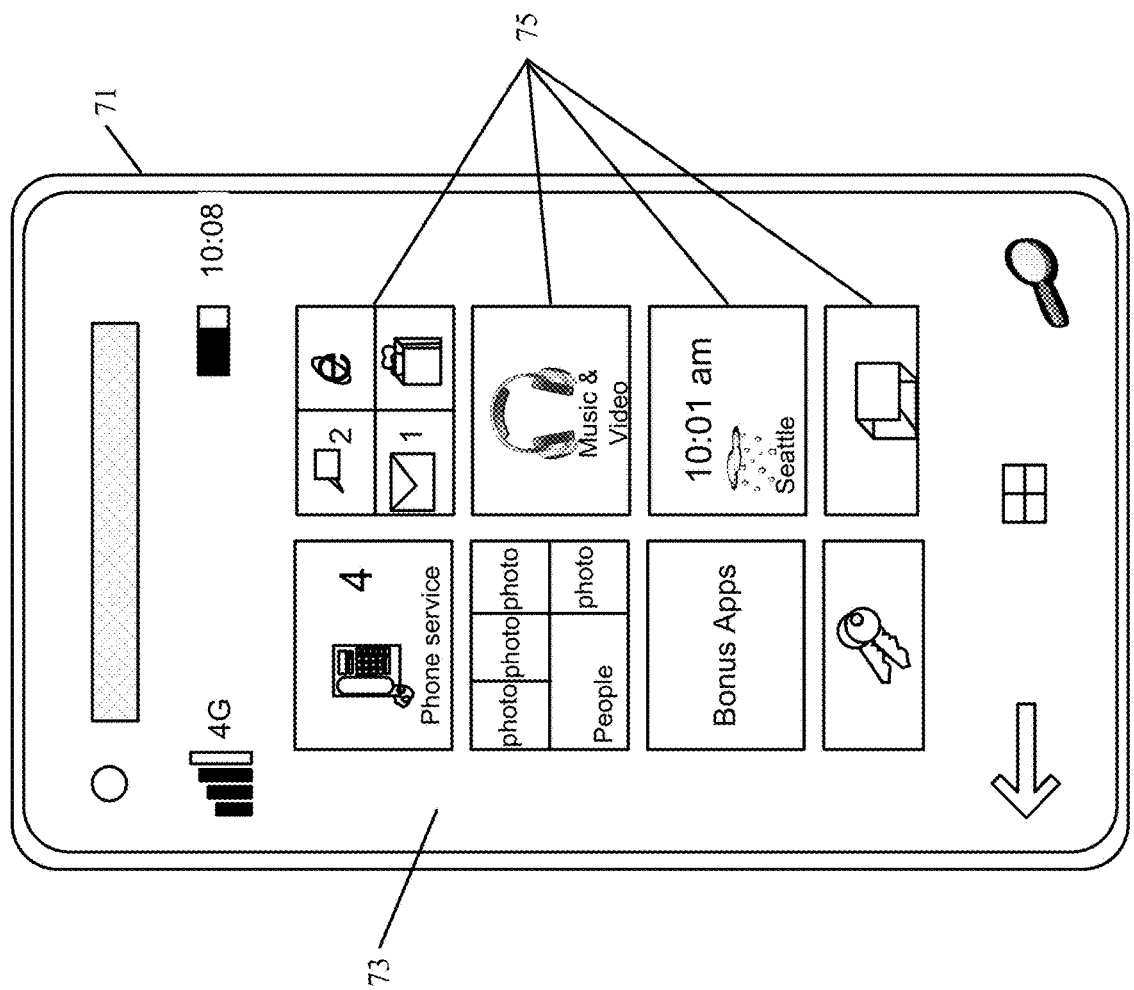

FIG. 8 is a simplified block diagram of one illustrative example of a handheld or mobile computing device that can be used as a user's or client's hand held device 16, in which the present system (or parts of it) can be deployed. FIGS. 9-10 are examples of handheld or mobile devices.

FIG. 8 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 124 or 150 or processors in systems 106-108 or 116 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 9 shows one example in which device 16 is a tablet computer 600. In FIG. 9, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1×rtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
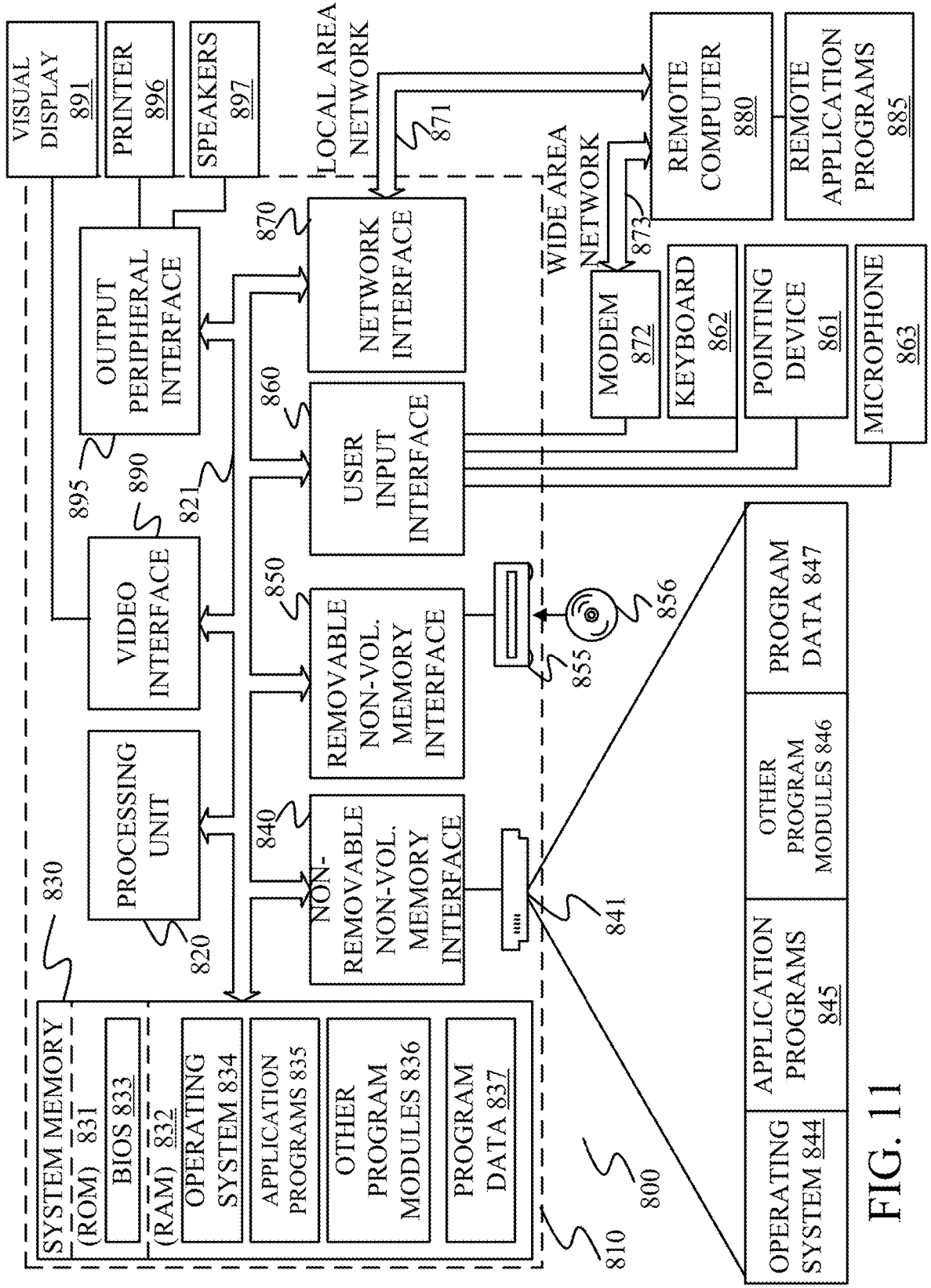
FIG. 11 is a block diagram of one example of a computing environment that can be used in the architectures shown in the previous figures.

FIG. 11 is one example of a computing environment in which architecture 100, or parts of it, (for example) can be deployed. With reference to FIG. 11, an example system for implementing some embodiments includes a general-purpose computing device in the form of a computer 810. Components of computer 810 may include, but are not limited to, a processing unit 820 (which can comprise processor 124, 150 or processors in systems 106-108 or 116), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
a user tagging component that identifies a user within an organization and tags the user with a user tag indicative of a data center association identifier, that associates a given data center in a remote server environment with the user, and an organization presence indicator indicative of the organization;
a provision routing system that automatically detects an administrator user input, at an administrative user system, to provision resources for the identified user and re-directs the administrative user system to a provisioning system at the given data center, based on the data center association identifier for the identified user; and
a computer processor that is activated by the user tagging component and the provision routing system to facilitate tagging the user and re-directing the administrative user system.

Example 2 is the computing system of any or all previous examples wherein the provision routing component automatically re-directs the administrative user system to the given data center by exposing, to the administrative user system, data center-specific links to a provisioning system in the given data center.

Example 3 is the computing system of any or all previous examples wherein the data center-specific links comprise a set of data center-specific uniform resource locators.

Example 4 is the computing system of any or all previous examples and further comprising:
a data center configuration system that generates data center configuration user interface displays for surfacing at the administrative user system, with user input mechanisms that are actuated to configure a data center for the organization.

Example 5 is the computing system of any or all previous examples wherein the data center configuration system displays the user input mechanisms with an addition user input mechanism that is actuated to add a new data center to the computing system for the organization.

Example 6 is the computing system of any or all previous examples wherein the data center configuration system, in response to detecting actuation of the addition user input mechanism, displays a data restriction user input mechanism that is actuated to set data restrictions for handling data at the new data center.

Example 7 is the computing system of any or all previous examples and further comprising:
a cross-data center accessing system that detects a resource request from the user and re-directs the resource request to the given data center based on the tag.

Example 8 is the computing system of any or all previous examples wherein the cross-data center accessing system comprises:
a user tag identifier component that accesses the user tag and identifies the given data center based on the data center association and the organization presence indicator.

Example 9 is the computing system of any or all previous examples wherein the cross-data center accessing system comprises:
a permission routing system that re-directs the resource request to the given data center for application of data restrictions, by the given data center, that are set at the given data center, and for permission processing based on user permissions at the given data center.

Example 10 is the computing system of any or all previous examples wherein the cross-data center accessing system comprises:
a cross-data center search system that receives a search request from the user and executes the search request across all data centers in the computing system for the organization.

Example 11 is a computer implemented method, comprising:
identifying a user within an organization;
tagging the user with a user tag indicative of a data center association identifier, that associates a given data center in a remote server environment with the user, and an organization presence indicator indicative of the organization;
automatically detecting an administrator user input, at an administrative user system, to provision resources for the identified user; and
re-directing the administrative user system to the given data center provisioning system, based on the data center association identifier for the identified user.

Example 12 is the computer implemented method of any or all previous examples wherein tagging comprises:
accessing a set of data center association rules for the organization; and
tagging the user based on the data center association rules.

Example 13 is the computer implemented method of any or all previous examples wherein re-directing the administrative user system to the given data center comprises:
exposing, to the administrative user system, data center-specific navigation links to a provisioning system in the given data center.

Example 14 is the computer implemented method of any or all previous examples and further comprising:

generating data center configuration user interface displays for surfacing at the administrative user system, with user input mechanisms that are actuated to configure a data center for the organization.

Example 15 is the computer implemented method of any or all previous examples wherein generating the data center configuration user interface displays comprises:

displaying the user input mechanisms with an addition user input mechanism that is actuated to add a new data center to the computing system for the organization; and in response to detecting actuation of the addition user input mechanism, displaying a data restriction user input mechanism that is actuated to set data restrictions for handling data at the new data center.

Example 16 is the computer implemented method of any or all previous examples and further comprising:

detecting a resource request from the user; and re-directing the resource request to the given data center based on the tag.

Example 17 is the computer implemented method of any or all previous examples wherein re-directing the resource request comprises:

re-directing the resource request to the given data center for application of data restrictions, by the given data center, that are set at the given data center, and for permission processing based on user permissions at the given data center.

Example 18 is a computing system, comprising:

a user tag identifier component that accesses a tag, corresponding to a user in an organization who is accessing the computer system, to identify a given data center, of a plurality of different data centers used by the organization, associated with the user;

a cross-data center accessing system configured to detect a resource access request from the user, indicative of the user accessing a resource; and a permission routing system that re-routes the resource access request to the given data center for permission processing to respond to the resource access request.

Example 19 is the computing system of any or all previous examples and further comprising:

a cross-data center search system that receives a search request from the user and executes the search request across all data centers in the computing system for the organization.

Example 20 is the computing system of any or all previous examples and further comprising:

a user tagging component that identifies the user within the organization and tags the user with the user tag; and a provision routing system that automatically detects an administrator user input, at an administrative user system, to provision resources for the identified user and re-directs the administrative user system to a provisioning system at the given data center, based on the data center association identifier for the identified user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
at least one processor; and
memory storing instructions executable by the at least one processor, wherein the instructions, when executed, configure the computing system to provide:
a user tagging component configured to:
identify a first user associated with an organization; and
store a user tag that corresponds to the first user and includes a data center association identifier, that associates a given data center in a remote server environment with the first user; and
a provision routing system configured to:
automatically detect an administrator user input, at an administrative user system, indicative of a request from an administrator user to provision a computing resource for the first user;
access the stored user tag that corresponds to the first user;
based on the data center association identifier in the stored user tag, expose, to the administrative user system, a data center-specific link to a provisioning system in the given data center;
direct the administrative user system to the provisioning system, at the given data center, using the data center-specific link, the provisioning system being configured to provision a computing resource in the given data center for the first user.

2. The computing system of claim 1 wherein the data center-specific link comprises a data center-specific uniform resource locator.

3. The computing system of claim 1 wherein the instructions configure the computing system to provide:
a data center configuration system configured to:
generate a data center configuration user interface display that is displayed by the administrative user system and includes a user input mechanism; and
based on an indication of actuation of the user input mechanism, configure a data center for the organization.

4. The computing system of claim 3 wherein the user input mechanism comprises an addition user input mechanism that is actuated to add a new data center to the computing system for the organization.

5. The computing system of claim 4 wherein the data center configuration system is configured to, in response to detecting actuation of the addition user input mechanism, display a data restriction user input mechanism that is actuated to set data restrictions for handling data at the new data center.

6. A computer implemented method, comprising:
identifying a first user within an organization;
storing a user tag that corresponds to the first user and includes:
a data center association identifier, that associates a given data center in a remote server environment with the first user, and
an organization presence indicator that associates the first user with the organization;
automatically detecting an administrator user input, at an administrative user system, indicative of a request from an administrator user to provision resources for the first user;
accessing the stored user tag that corresponds to the first user;
based on the data center association identifier in the stored user tag, exposing, to the administrative user system, a data center-specific navigation link to a provisioning system in the given data center; and
directing the administrative user system to the provisioning system in the given data center using the data center-specific navigation link.

7. The computer implemented method of claim 6 wherein tagging comprises:

accessing a set of data center association rules for the organization; and tagging the user based on the data center association rules.

8. The computer implemented method of claim 6 and further comprising:

generating a data center configuration user interface display that is displayed by the administrative user system and includes a user input mechanism that is actuatable to configure a data center for the organization.

9. The computer implemented method of claim 8 wherein generating the data center configuration user interface display comprises:

displaying an addition user input mechanism that is actuated to add a new data center to the computing system for the organization; and in response to detecting actuation of the addition user input mechanism, displaying a data restriction user input mechanism that is actuated to set data restrictions for handling data at the new data center.

10. A computing system, comprising:

at least one processor; and memory storing instructions executable by the at least one processor, wherein the instructions, when executed, configure the computing system to:

identify a first user associated with an organization;

store a user tag that corresponds to the first user and includes a data center association identifier, that associates a given data center in a remote server environment with the first;

automatically detect an administrator user input, from an administrative user system, indicative of a request from an administrator user to provision a computing resource for the first user;

access the stored user tag that corresponds to the first user;

based on the data center association identifier in the stored user tag, expose, to the administrative user system, a data center-specific link to a provisioning system in the given data center;

direct the administrative user system to the provisioning system, at the given data center, using the data center-specific link, the provisioning system being configured to provision a computing resource in the given data center for the first user;

receive a search request from the first user; and based on the data center association identifier in the stored user tag, execute the search request in the given data center that is configured to respond to the search request by performing permission processing to enforce a permission associated with the first user.

11. The computing system of claim 1 wherein the provisioning system is configured to:

generate a user interface; and based on input received from the administrative user system through the user interface, provision the computing resource.

* * * * *